I. JACKSON.
BELT FASTENER.
APPLICATION FILED FEB. 24, 1910.
978,025.
Patented Dec. 6, 1910.
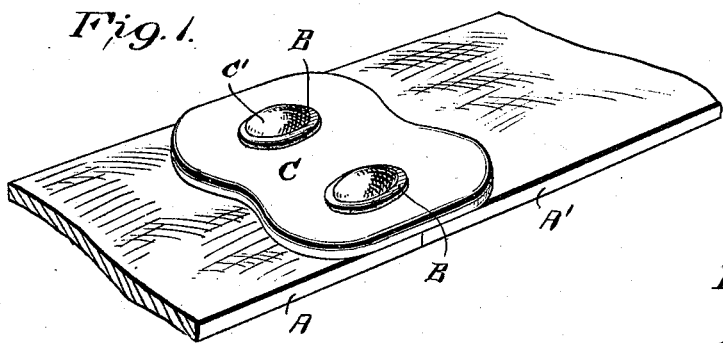
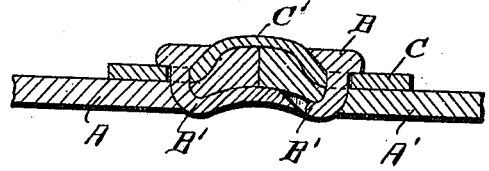
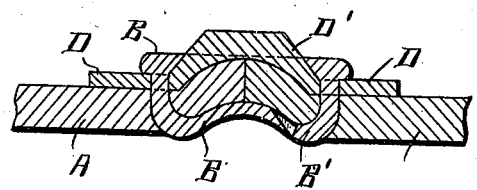
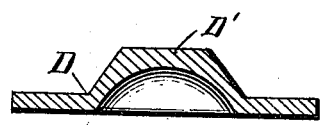
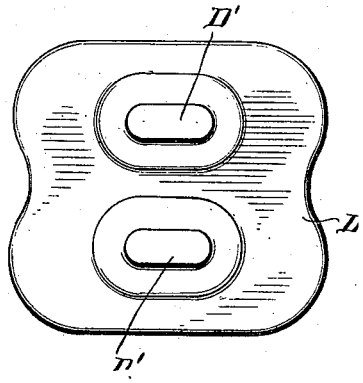
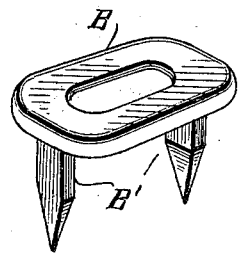
Witnesses
J. Adolph Bishop
C. S. Brown
Inventor
Isaac Jackson
by Foster Freeman Watson & Coit
Attorneys
THE NORRIS PETERS CO., WASHINGTON, D. C.

UNITED STATES PATENT OFFICE.

ISAAC JACKSON, OF GLOSSOP, ENGLAND.

BELT-FASTENER.

978,025.  Specification of Letters Patent.  Patented Dec. 6, 1910.

Application filed February 24, 1910. Serial No. 545,639.

*To all whom it may concern:*

Be it known that I, ISAAC JACKSON, a subject of the King of Great Britain and Ireland, and a resident of Glossop, in the county of Derby, England, have invented new and useful Improvements in Belt-Fasteners, of which the following is a specification.

This invention relates to improvements in means for connecting the ends of driving belts and particularly to fasteners of that type which comprise an apertured metal plate adapted to overlap the ends of such a belt and provided on one face with teeth which pass through the belt and when clenched deflect portions of the body of the belt into the adjacent aperture to form a connection between the belt and plate supplemental to that afforded by the teeth.

Particularly the present invention relates to a construction whereby the body of the fastening plate does not come into direct contact with the belt but is separated therefrom by a washer or "safe" of leather or other suitable material, through which the teeth of the fastener pass and which is forced into the aperture in the plate when the teeth are clenched.

In the accompanying drawings, Figure 1 is a perspective view illustrating a section of a driving belt having its ends connected by fasteners embodying the present invention; Fig. 2 is a longitudinal sectional view taken through one of the fasteners; Fig. 3 is a similar view illustrating a modified form of washer or "safe"; Fig. 4 is a detail sectional view of the washer or "safe" shown in Fig. 3; Fig. 5 is a plan view of such washer; and Fig. 6 is a detail perspective view of one of the fasteners.

Referring to the drawings, A, A' designate the ends of a driving belt and B designates the body of the metal fastener employed for connecting such ends. Said body may be of any desired outline and size being shown as substantially elliptical in form, and is provided on one face with suitable teeth or spurs B' which are adapted to penetrate the body of the belt and to be clenched against the under face thereof. Such teeth are arranged at opposite sides of an aperture formed in the plate and into which when the teeth are clenched, are forced portions of the end sections A, A' of the belt to provide a connection between the plate and fastener which is supplemental to that furnished by the teeth.

To protect the surface of the belt against which the body of the fastener is applied, a washer or "safe" C of leather or other suitable material is placed over the surface of the belt beneath the body of the fastener. This washer is shown as of such size that it projects beyond the body of the fastener at all points and surrounds the teeth B'. When the teeth are clenched, both the portions of the belt beneath the aperture in the plate B as well as the section of the washer C beneath said aperture will be forced outwardly as shown in Fig. 2, so that said aperture is completely filled and in some instances, the deflected portion C' of the washer will project beyond the outer surface of the plate B. Preferably, the walls of the ends of the aperture in the fastening plate are inclined inwardly and upwardly from the lower surface of the plate to form bearing surfaces which receive the pressure of the deflected portions of the belt and washer and thus relieve to some extent the strain which is placed upon the teeth. When the deflection of the belt by clenching the fastening prongs or teeth is sufficient to cause a portion of the washer C to project beyond the outer face of the plate B, such projecting portion forms a pad or cushion which may contact with a jockey or "idle" pulley arranged adjacent that face of the belt upon which the fastener is placed, and thereby is avoided the noise and wear which would be incident to the metal fastener striking such a pulley. An increased cushioning effect is obtained by using a washer D of the form shown in Figs. 3 to 5 inclusive. In this form of the invention, the washer or "safe" is made in the cross sectional form shown in Figs. 3 and 4, the section thereof which extends through the aperture in the fastener being of greater thickness than the portions thereof which surround the teeth. In case the washer is provided with a plurality of such projecting sections D', as shown in Fig. 5, it will be seen that the projections act as guides for properly positioning the fasteners on the belt.

The washers herein referred to, particularly when of the form shown in Figs. 3 to 5, may be molded from india rubber and thereby the cushioning effect materially increased.

Having thus described the invention, what is claimed and desired to be secured by Letters Patent, is:—

1. A belt fastener comprising a perforated plate adapted to be applied against the outer surface of a belt and having a tooth adapted to extend through the belt and to force a portion thereof outwardly into a perforation in the plate when clenched against the surface opposite that on which the plate bears, and a protecting body extending across said perforation and about the tooth.

2. A belt fastener comprising a plate having therein a perforation and two projecting teeth which are separated by said perforation and are adapted to extend through a belt and to force a portion thereof into said perforation, and a protecting sheet extending about said teeth and outwardly through the perforation in the plate.

3. A belt fastener comprising a plate having therein a perforation and two projecting teeth which are separated by said perforation and are adapted to extend through a belt and to force a portion thereof into said perforation, and a protecting sheet extending about said teeth and outwardly through the perforation in the plate, the portion of said sheet projecting beyond the outer face of the plate being of greater thickness than the other portions thereof, for the purpose described.

In witness whereof I have hereunto set my hand in the presence of two subscribing witnesses.

ISAAC JACKSON.

Witnesses:
  WILLIAM GEO. HEYS,
  JOHN O'CONNELL.